UNITED STATES PATENT OFFICE.

FRANK JONES AND CHARLES L. PENNELL, OF MASSILLON, OHIO.

COMPOSITION OF MATTER.

SPECIFICATION forming part of Letters Patent No. 695,730, dated March 18, 1902.

Application filed April 16, 1901. Serial No. 56,091. (No specimens.)

*To all whom it may concern:*

Be it known that we, FRANK JONES and CHARLES L. PENNELL, citizens of the United States, and residents of Massillon, in the county of Stark and State of Ohio, have invented a new and Improved Composition of Matter to be Used as a Core for Casting Pipes and other Tubular Bodies, the object of the invention being to produce a core which can be readily removed after the pipe has been cast to permit proper cooling of the pipe.

The composition consists, essentially, of a vegetable fiber, such as peat, mixed with a binding substance and applied to a central bar, the bar, with the mixture, being placed in an oven, so that the mixture may harden previous to using it as a core in the mold. For making light or heavy castings different binding substances are used; but it is expressly understood that each mixture consists, essentially, of vegetable fiber and a binding substance.

For making light-weight castings the composition consists, preferably, of twenty-five per cent. of peat or vegetable soil, fifty per cent. of clay, twenty per cent. of straw, one per cent. of tar, one per cent. of soda-ash, three per cent. of lime. This mixture is applied to the core-bar, and then the latter is placed into an oven for the mixture to dry on and adhere to the core-bar, and after the latter is removed from the oven a coat of pipe-blacking or lime is applied, and after drying in an oven or otherwise the core-bar is then ready for use. For making heavy castings the straw and tar may be omitted, and then the composition consists of seventy-four per cent. of peat or vegetable soil, twenty-four per cent. of clay, one per cent. of soda-ash, one per cent. of lime. This mixture is applied to the core-bar, and immediately over it is applied a coat of loam, which in turn is coated with pipe-blacking or lime. The core-bar is then placed in an oven for the mixture to dry and harden on the core-bar. It is then ready for use.

Core-bars heretofore used were wrapped with a hay rope coated with clay, covered in turn with loam coated with pipe-blacking. In the use of this core-bar the hay rope gives the desired vent and burns away to permit of withdrawing the core-bar.

Having thus fully described our invention, we claim as new and desire to secure by Letters Patent—

1. A composition of matter to be used as a core for casting pipes and other tubular articles, containing peat, clay and soda-ash, substantially as specified.

2. A composition of matter to be used as a core for casting pipes and other tubular articles containing peat, clay, soda-ash and lime, substantially as specified.

3. A composition of matter to be used as a core for casting pipes and other tubular articles, consisting of peat, clay, straw, tar, soda-ash and lime, substantially as specified.

In testimony whereof we have signed our names to this specification in the presence of two subscribing witnesses.

FRANK JONES.
CHARLES L. PENNELL.

Witnesses:
H. B. SIBILA,
JOS. BROWNSBERGER.